United States Patent [19]

Hammond

[11] Patent Number: 6,054,149
[45] Date of Patent: Apr. 25, 2000

[54] USE OF RICE BRAN EXTRACT AS A PROCESSING AID

[75] Inventor: Neal A. Hammond, Woodland, Calif.

[73] Assignee: Bran Tec, Inc., Webster Groves, Mo.

[21] Appl. No.: 09/079,750

[22] Filed: May 15, 1998

Related U.S. Application Data

[60] Provisional application No. 60/046,905, May 16, 1997.

[51] Int. Cl.$^7$ ................................................ A21D 2/00
[52] U.S. Cl. ............................. 426/18; 426/31; 426/49; 426/52; 426/516; 426/517; 426/549
[58] Field of Search .................................. 426/18, 19, 20, 426/21, 48, 49, 52, 31, 549, 516, 517

[56] References Cited

U.S. PATENT DOCUMENTS

| | | | |
|---|---|---|---|
| 3,885,052 | 5/1975 | Starr | 426/250 |
| 4,225,630 | 9/1980 | Pitchon | 426/623 |
| 4,959,233 | 9/1990 | Schou et al. | 426/443 |
| 5,292,537 | 3/1994 | Hammond | 426/44 |
| 5,376,390 | 12/1994 | Hammond | 426/44 |
| 5,512,307 | 4/1996 | Hammond | 426/44 |
| 5,753,283 | 5/1998 | Hammond | 426/44 |

OTHER PUBLICATIONS

Hammond, N., 362331 Frosti, abstracting Cereal Foods World, 1994, 39(10), 752, 754.
Rice: Chemistry & Technology, Ed. D.F. Houston, American Association of Ceral Chemists, 1972.
Rice Bran Ingredients Boast Functionality, Nutrition, Prepared Foods, Jan. 1, 1995.
The Integrated Approach to Distilled Monoglycerides, Archer Daniels Midland Company, © Jan. 1997.

*Primary Examiner*—Leslie Wong
*Attorney, Agent, or Firm*—Grace J. Fishel

[57] ABSTRACT

A rice bran extract formed from a rice bran with a naturally occurring lipase enzyme causing rancidity that has been inactivated with an antilipase enzyme has unique functionality as a processing aid with workable doughs. The rice bran extract improves the machinability of the dough and/or provides positive function effects on texture, bulk density, etc. of the final product.

11 Claims, 2 Drawing Sheets

Myvaplex® formulation

Rice Bran Extract formulation

USE OF RICE BRAN EXTRACT AS A PROCESSING AID

This application claims the benefit of U.S. provisional patent application Ser. No. 60/046,905, filed May 16, 1997, for Method for Improving Extrusion Characteristics.

BACKGROUND OF THE INVENTION

1. Field of the Invention

The present invention relates to the use of a rice bran extract as a processing aid for a workable dough, wherein the rice bran extract improves the machinability of the dough and/or provides positive functional effects on texture, bulk density, etc. of the final product.

2. Brief Description of the Prior Art

Doughs that are "workable" or machinable can be extruded or sheeted. In the case of doughs that contain starch, the extruded or sheeted product is then dried, baked, fried, etc. into a final product. Monoglycerides (or mixtures of mono- and diglycerides) are typically added to starch containing doughs to improve the workability of the dough. At various levels, depending on the composition of the dough, increasing amounts of monoglycerides have an adverse affect on the product, affecting expansion, cell structure, bulk density, texture, etc. Other chemicals can be added to counteract the effect of the monoglycerides on product quality, but their addition complicates the formula, also possibly changing the product. For example, AVICELL (a silicon dioxide sold by Hercules) is added to extruded doughs to counteract the effect of MYVAPLEX (a distilled monoglyceride sold by Quest International).

Rice bran extracts have been used as emulsifiers in baked goods, confectioneries and extruded products. They have an advantage over monoglycerides in that they are all natural and lower in fat. It has now been found that rice bran extracts, as described herein, can be used as a processing aid for a workable dough, alone or in combination with monoglycerides (or mixtures of mono- and diglycerides). The rice bran extracts, at the recommended usage rate, improve the machinability of the dough and/or provide positive functional effects on texture, bulk density, etc. of the final product.

BRIEF SUMMARY OF THE INVENTION

In view of the above, it is an object of the present invention to provide a processing aid that improves the machinability of the dough and/or provides positive functional effects on texture, bulk density, etc. of the final product. More particularly, it is an object to provide a processing aid for an extruded dough that decreases surging, reduces downtime, reduces plugging of the dies, decreases amps/torque, extends the life of consumable parts, reduces drying time and compensates for worn parts. It is another object to provide a processing aid that can be used to control expansion, control bulk density, modify product strength, modify cell structures, improve shape definition, enhance flavor of the final product and is workable with starches from a variety of sources. Other objects and features of the invention will be in part apparent and in part pointed out hereinafter.

In accordance with the invention, a method for improving machinability of a workable dough and/or providing improved functional properties in an extruded or sheeted product comprises adding a rice bran extract as a processing aid to a pasty mass that can be extruded or sheeted, said rice bran extract having been prepared by treating rice bran having a naturally occurring lipase enzyme that causes rancidity with an antilipase enzyme in the presence of water for a time sufficient to substantially deactivate the lipase enzyme and separating the rice bran into an insoluble dietary fiber component and a rice bran extract.

The invention summarized above comprises the methods hereinafter described, the scope of the invention being indicated by the subjoined claims.

DETAILED DESCRIPTION OF THE INVENTION

Figure 1:
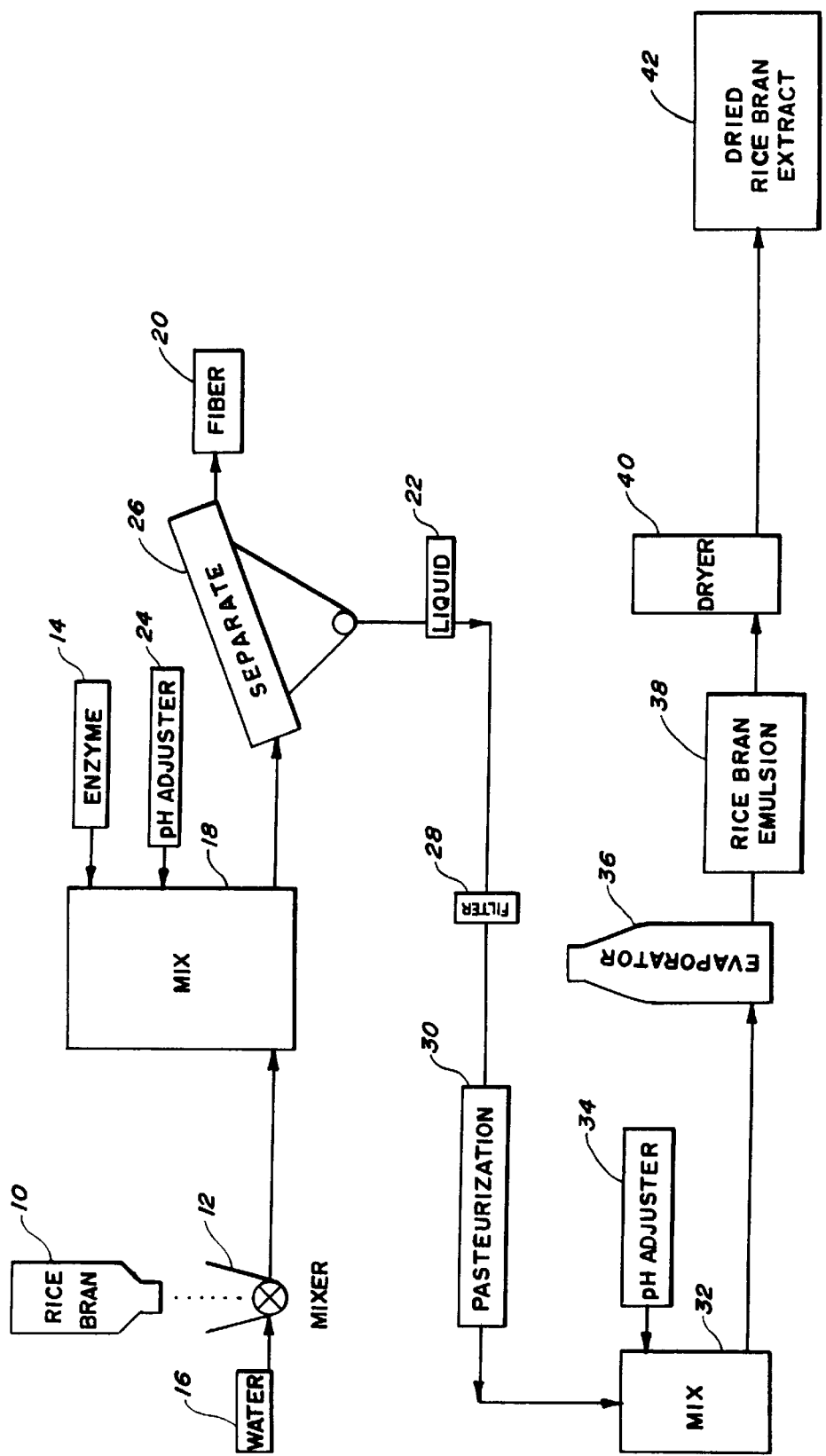
FIG. 1 is a schematic flow chart showing a method for producing a rice bran extract useful as a processing aid with workable doughs.

The improvement provided by the present invention is applicable to workable doughs which are extruded or sheeted and prepared for both human and animal consumption, as well as to non-food products.

As used herein, the term "workable dough" means a pasty mass that can be extruded or sheeted. The pasty mass may be primarily protein, starch or some other ingredient, usually wetted with water, oil or other fluid. The term "starch" is meant to include any cereal or root starch or flour. Examples of suitable materials include maize, rice, wheat, sorghum, oats, barley, tapioca, potato, and the waxy versions thereof as well as their derivatives such as corn meal, hominy, wheat middlings, and other like ingredients. Converted, i.e., acid treated starches, or chemically modified starches may also be used in the dough processed according to the subject method. Other ingredients, not containing starch, may be included in the dough such as fats, oils, salt, leavening agents, flavoring ingredients, etc.

In accordance with the present invention, rice bran extract is employed as a processing aid at a usage level between about 0.1% by weight and 2.0% by weight, replacing the monoglycerides or used in combination with monoglycerides and/or other extruder or sheeting processing aids. Unlike the monoglycerides, when rice bran extract is used as an extrusion processing aid in the above-mentioned range, the machinability of the dough is improved without adversely affecting the cell structure, bulk density and texture of the product, and in many cases improving it.

The usage rate depends upon the nature of the starch and the processing conditions decided upon. For example, as an extrusion processing aid with cereals, 0.25 to 0.5% by weight rice bran extract is recommended. To reduce stickiness in flakes, 0.5% by weight is required, in pasta from 0.5 to 1% by weight and in snacks from 0.25 to 0.5% is sufficient. In a wheat pasta, 0.5% by weight rice bran extract is recommended, whereas in rice pasta, higher usage rates may be desirable, rice being stickier. In retort pasta, the recommended level is 1.0 to 2.0% by weight and in laminate pasta, the usage rate should be between 1.0 and 1.5% by weight. As compared with monoglyceride extrusion processing aids such as MYVAPLEX, the usage level of the rice bran extract is ⅓ to ¼ the usage rate of MYVAPLEX when processing potatoes, whereas with rice, the usage rate is two times that of MYVAPLEX.

Apparently, some starches are more compatible with the rice bran extract or have a synergistic relationship with the rice bran extract, affecting the usage levels. In snacks formed of corn or potato flours, the usage level is lower, from about 0.25 to 0.5% by weight, because the shear, temperature and pressure are higher in a cooking extruder than in a forming extruder.

The data listed below provides starter information for preparing cereals:

| Applications | Use Rates | Benefits |
| --- | --- | --- |
| Rice Crisps | 0.25–0.5% | Improved Expansion, Blistering, Modified Cell Structure, Less Plugging of Dies, Better Throughput, Reduced Bulk Density |
| | 1–2% | Increased Expansion, Increased Cell Size, Lower Bulk Density, Improved Strength |
| Loops (corn, wheat, etc.) | 0.25–0.5% | Improved Expansion, Improved Definition of Shape, Reduced Bulk Density (except oats), Improved Throughput, Reduced Torque/Amps |
| Puffs (corn, wheat, etc.) | 0.25–0.5% | Improved Expansion, Improved Definition of Shape, Reduced Bulk Density, Improved Throughput, Reduced Torque/Amps |
| Flakes (corn, wheat, bran) | 0.5% | Reduced Stickiness in Pellets, Improved Release from Flaking Rollers, Reduced Tailings, Decreased Surging, Reduced Torque/Amps |
| Threads (high fiber) | 0.5% | Reduced Surging, Improved Throughput, Smoothed out Operating conditions, Reduced Torque/Amps |

The rice bran extract is very effective in a wide variety of snack systems using many different grains (corn, wheat, oats, rice, potato, etc.) and with a variety of different coatings (sweet, savory, spicy, etc.). The data listed below provides starter information for preparing snacks:

| Applications | Use Rates | Benefits |
| --- | --- | --- |
| Curls (corn, rice, etc.) | 0.2–0.5% | Enhanced Texture, Reduced Bulk Density, Uniform Cell Structure, Modified Curl, Reduced Torque, Improved Throughput |
| Filled Pillows | 0.25–0.5% | Enhanced Definition of Shape, Modified Cell Structure, Improved Strength, Reduced Dryer Needs |
| Shapes (corn, wheat, potato, etc.) | 0.25+% | Enhanced Definition of Shape, Enhanced Flavor, Improved Throughput, Reduced Torque/Amps, Reduced Plugging of Dies, Extended Die Life |

The rice bran extract is effective in many types of pasta and noodles. Work has been done with semolina as well as with specialty ingredients (e.g., rice, corn, wheat, oats, potato, etc.). Trials have been done on dry, fresh, retort, laminated and instant pasta. Each application has different needs; however, the rice bran extract has provided benefits in each system. In laminated/sheeted pasta and noodles, the rice bran extract is a natural dough conditioner due to the pentosans extracted from the rice bran. The pentosans and unique proteins improve machinability and provide other benefits as noted below.

Use rates of the rice bran extract in pasta and noodles depend on the grain used, formulation, desired product, desired product modification and type of equipment. The data listed below provides starter information for pasta and noddles:

| Applications | Use Rates | Benefits |
| --- | --- | --- |
| Semolina | 0.5% or less | Better Throughput, Less Torque/Amps, Natural Replacement for GMS |
| Rice | 1+% | Smoother Running, Decreased Stickiness, Improved Binding, Adds Strength, Improved Output, Decreased Downtime |
| Corn | 0.5–0.75% | Smoother Running, Decreased Stickiness, Improved Throughput, Improved Binding, Enhanced Flavor |
| Laminated or Noodles | 1.0–1.5% | Dough Conditioning, Improved Machinability, Decreased Stickiness, Improved Throughput, Leavening Agent, Reduced Rest Time |
| Retort | 1.0–2.0% | Added Strength/Firmness to Pasta, Reduced Egg Content, Eliminated GMS, No Change in Flavor |

The rice bran extract is effective in many snack and cereal pellets as a processing aid. Testing has demonstrated a reduction in stickiness of pellets and allows the product to be extruded at a lower moisture content. Use rates of rice bran extract are based on grain used, formulation ratio, desired product, desired product modification and type of equipment.

The data provided below provides starter information for snack and cereal pellets:

| Applications | Use Rates | Benefits |
| --- | --- | --- |
| Flakes (corn, wheat, bran, etc.) | 0.5% | Reduced Stickiness in Pellets, Improved Release from Flaking Rollers, Reduced Tailings, Decreased Surging, Reduced Torque/Amps |
| Snack Pellets | 0.5% | Reduced Stickiness in Pellets, Allows for Reduced Moisture Formulations, Reduced Tailings, Reduced Torque/Amps |

The rice bran extract is also a problem solver in pet food applications. In specialized diet formulas, which present extrusion problems, the rice bran extract shifts the extrusion control range and provides slight antioxidant characteristics. The data listed below may have to be adjusted slightly to fit a user's exact needs, equipment and operating conditions:

| Applications | Use Rates | Benefits |
| --- | --- | --- |
| Special Diets (pets with compromised health) | 0.5–3+% | Improved Wettability of Flours, Improved Uniformity of Cook, Improved Definition of Shape, Improved Yields & Quality, Reduced Wear on Equipment |
| Premium Products | 0.5–2+% | Improved Texture, Reduced Influences of Fat on Extrusion, Improved Density Control, Reduced Fines, Reduced Equipment Wear |
| Extruded Treats | 0.5+% | Improved Expansion, Improved Throughput, Reduced Moisture Requirements, Decreased Surging, Reduced Equipment Wear |
| Baked Treats | 0.5–1+% | Improved Mixing, Improved Dough Conditioning, Improved Die Release, Reduced Equipment Wear |

In pet foods, a shift of the extrusion control range allows improved cooking control for high fat products, products with high digestibility, and products high in rice that often present difficulty in density control. Diets high in fat present special extrusion problems because the fat impedes cooking of the starches, making proper cooking difficult. A crumbly product is often the result. This reduces yields and the apparent quality of the product, and causes fines to collect in the bottom of the bag. When rice bran extract is used as a processing aid, water can be added at higher levels to control density. Because the fat (in the formulation) is a lubricant as well as a source of energy, it tends to reduce the mechanical energy input to the dough, thus reducing the degree of cook. This reduction of cook can be manifested as reduction of operating range and/or shift of operating range. The rice bran extract emulsifies the fat, thus helping to reduce its effect on the extrusion process. Since the rice bran extract can be added as a dry ingredient, the liquid level of the formula can be reduced, when a liquid reduction is desired.

The rice bran extract used in the present invention is prepared by treating rice bran having a naturally occurring lipase enzyme that causes rancidity with an antilipase enzyme in the presence of water for a time sufficient to substantially deactivate the lipase enzyme. The rice bran is then separated into an insoluble dietary fiber component and a rice bran extract which is dried or provided as a liquid emulsion. Dried rice bran extract can be blended with the other dry ingredients as the dough is formed or, when provided as a liquid emulsion, added with the water or oil, at strategic points, since the rice bran extract is both water and oil soluble. If the rice bran extract is used in combination with a monoglyceride such as NYVAPLEX, the processing aids are dry blended with the dry ingredients to provide a homogeneous mixture. MYVAPLEX is also provided in liquid form and can be mixed with the liquid emulsion of rice bran extract and added with the water.

U.S. Pat. No. 5,292,537 to Hammond describes a method for stabilizing rice bran and rice bran products. When rice is harvested in the form of paddy or rough rice, the kernel is enveloped by a rice hull. After being dried, rice is milled to remove the hull, yielding brown rice. In a second stage of milling, the outer brown layer is removed from the rice kernel to yield polished or white rice. Depending on the milling techniques, rice bran may include part of the germ and be mixed with part of the hull. Full-fat rice bran contains about 18–21% fat and has naturally occurring lipases that hydrolyze the fat into glycerol and free fatty acids which give the product a rancid smell and taste. Under normal milling conditions, rice bran will degrade into an unpalatable material which is not suitable as human food. Because of the problem with rancidity, most rice bran is used as feed for animals, fertilizer or fuel.

As described in U.S. Pat. No. 5,292,537, the lipase enzyme can be deactivated by treatment with an antilipase enzyme. In a preferred embodiment, and with reference to FIG. 1, rice bran 10 is provided as a flour preferably ground to the point that all of the material will pass through a 40 mesh screen. A quantity of the rice bran is placed in a mixer 12 and an inactivating enzyme 14 is selected to inactivate the naturally occurring lipase in the rice bran. Suitable materials for this purpose are known to include nonspecific proteases of plant and fungal origin. For example, papain, an enzyme naturally occurring in papaya fruit, and bromelin, an enzyme naturally occurring in pineapples, function as suitable antilipase enzymes when used as described below. Enzeco Fungal Protease brand concentrate, an enzyme fermented from various fungi, also functions as an antilipase enzyme. Enzeco Fungal Protease brand concentrate is a commercially available product from Enzyme Development Corporation located in New York City, N.Y. All the aforementioned antilipase enzymes appear to work with substantially the same degree of efficiency. Proteases of bacterial and animal origin (such as pancreatic) may also be useful and mixture of antilipase enzymes are also contemplated.

In general, freshly milled rice bran 10 has a water content of 20% by weight or less, in general about 10%. Water 16 is preferably added to the rice bran, prior to or concurrent with enzymatic treatment with the antilipase enzyme, as the enzymes function in aqueous or hydrated environments. Additional water above the threshold amount needed to activate the antilipase enzyme in general increases the speed of inactivation or stabilization. In a commercial process, 1 gallon of water at a temperature between 130 and 135° F. is added to 1 pound of rice bran in mixer 12. The rice bran and water mixture is pumped into a holding tank 18 where the selected antilipase enzyme 14 is added to the mixture in an amount effective to substantially inactivate the lipase in a selected time that is dependent, as described above, on the amount of water used to wet the rice bran. For this purpose, antilipase enzyme is preferably employed at levels from about 0.01% to 0.1% by weight. After the antilipase enzyme is added, the mixture is maintained, preferably with continued mixing, at a temperature of about 20° C. to about 50° C. for a waiting period sufficient for the antilipase enzyme to inactivate substantially all of the naturally occurring lipase in the rice bran. Within the above-mentioned ranges, waiting time is shorter at high temperatures and with higher levels of antilipase enzyme. At the end of the period, the rice bran has become a wet stabilized rice bran.

The wet stabilized rice bran is then further processed to separate insoluble dietary fiber 20 from a liquid phase 22. The pH of the wet stabilized rice bran affects the way in which the protein is partitioned. More particularly, proteins are more soluble when the pH is on the basic side. For that reason, it is preferred that the pH of the wet stabilized rice bran be adjusted with a pH adjuster 24 so that the pH is from about 7.5 to about 12. In this range, most of the proteins stay in water solution and are not denatured. Suitable food grade bases for the pH adjuster 24 include calcium hydroxide, sodium hydroxide, potassium hydroxide, ammonium hydroxide and so forth. In the commercial process as shown in FIG. 1, the pH is adjusted in holding tank 18 to pH 9.9 with sodium hydroxide.

The pH adjusted, wet stabilized rice bran in holding tank 18 is a slurry containing insoluble dietary fiber 20 and a liquid phase 22. This slurry is then separated on a screen 26 (a fine mesh rotary screen in the commercial process). The proteins and other nutritional components of the rice bran such as starches, fats, minerals, vitamins and so forth pass mainly with liquid phase 22. After the insoluble dietary fiber 20 has been separated from liquid phase 22, the liquid phase is passed through a filter 28 and a pasteurizer 30, after which it can be stored in a holding tank 32. The pH of the liquid phase is high (about 9.9) and is useful as a processing aid for specialty applications. Optionally, the pH of the liquid may be adjusted below 7.0 with a pH adjuster 34. The liquid slurry in tank 32 can be evaporated in evaporator 36, increasing the solids content (in the commercial process from 9.0% by weight to about 22–25% by weight), producing a liquid rice bran extract 38 for use in accordance with the present invention. If a dried processing aid is preferred, the liquid rice bran extract 38 can be dried in a drier 40 to produce a dried rice bran extract 42.

When the rice bran extract is produced from full-fat bran, the rice bran extract 42 comprises about 17% by weight proteins, 18–24% by weight fats, 38–46% by weight carbohydrates, 13% by weight ash and 6% by weight water.

When the rice bran has been defatted or partially defatted, the amount of fat in the rice bran extract is less. The exact composition of the rice bran extract will vary somewhat, depending on the variety of rice and growing season, which affects the composition of the rice bran. The composition of the rice bran will also vary with the rice mill, depending on how deep they go in taking off the outer layers to arrive at white rice. The functionality of the proteins, starches (e.g., pentosans), fats (e.g., phospholipids), present in the rice bran extract are affected by the proteolytic enzymatic treatment of the rice bran from which it is derived. Because of its processing, the proteins, starches, fats, etc. have increased availability for reaction with the components in a starch containing dough and the combined components are uniquely effective as processing aids.

The addition of the rice bran extract, either dried or as a liquid emulsion, within the above-mentioned ranges, can improve the extrusion characteristics of a dough containing starch without compromising cell structure, bulk density or texture of the product. The subjective evaluation of these characteristics depends on the finished product desired. The doughs can be made more machinable, leading to greater throughput and reduced power consumption. There is less wear and plugging of the dies, decreasing downtime. The addition of rice bran extract as an extruder processing aid can improve the flavor of corn products by rounding out the harsh or raw corn note, usually associated with corn treated with alkaline and extruded. The rice bran extract can also enhance puffing as evidenced by a decrease in bulk density in expanded products. In expanded products with a complex shape, the addition of rice bran extract as an extruder processing aid improves shape definition. The rice bran extract is 100% natural and when used at a level where it must be declared on the label, can be listed as "rice extract."

The following examples illustrate the invention.

EXAMPLE 1

A dry, expanded rice crisp was prepared from a dough containing starch. The control (sample 801) contained no extruder processing aid, whereas samples 802–811 contained MYVAPLEX, a mixture of MYVAPLEX and rice bran extract, or rice bran extract alone. Samples 804–811 are in accordance with the present invention, while samples 801–803 were prepared for the purpose of comparison.

As shown in Table 1, the formula for the dough was the same for each of the samples except for the addition of an extruder processing aid. The dough was formed in a twin screw Wenger TX52 cooker extruder. The bulk density for each sample is reported.

MYVAPLEX is the extruder processing aid in samples 802 and 803. Compared with the control, samples 802 and 803 show that increasing amounts of MYVAPLEX increased the bulk density beyond a certain application level (above 0.25%).

Samples 804–806 show decreasing amounts of MYVAPLEX and increasing amounts of rice bran extract. As the amount of MYVAPLEX went down and the amount of rice bran extract went up, the bulk density went down, demonstrating the negative effects on bulk density caused by increasing amounts of monoglycerides as compared to the positive effects of the rice bran extract.

Samples 807–811 show the addition of increasing amounts of rice bran extract. The bulk density decreased with increasing amounts of rice bran extract up to 0.75%. Above 0.75%, the bulk density increased slightly, but was still below that of the control or when MYVAPLEX was used, alone or in combination with rice bran extract. While the results show that rice bran extract alone is superior to MYVAPLEX, a mixture of MYVAPLEX and rice bran extract may be preferred, if rice bran extract is more expensive than monoglycerides such as MYVAPLEX, as the mixture provides satisfactory results.

The data in Table 1 also show that when the amount of MYVAPLEX was doubled (compare samples 802 and 803), the bulk density increased, whereas an 8-fold increase in the amount of rice bran extract did not increase the bulk density (compare sample 807 and 811). At the 2.0% level, the rice bran extract had a positive affect on dough machinability, making the dough more pliable and decreasing plugging of the dies, which in a commercial setting, has been shown to increase product output by more than 20%. In these trials, the primary reason for adding the rice bran extract at the 2.0% level was to create a blistered surface appearance and to add strength to the product.

TABLE 1

|  | Control | Myvaplex | | Blends | | | Rice Bran Extract | | | | |
| --- | --- | --- | --- | --- | --- | --- | --- | --- | --- | --- | --- |
| Ingredient | 801 | 802 | 803 | 804 | 805 | 806 | 807 | 808 | 809 | 810 | 811 |
| Rice Flour | 89% | 89% | 89% | 89% | 89% | 89% | 89% | 89% | 89% | 89% | 89% |
| Sucrose[1] | 7% | 7% | 7% | 7% | 7% | 7% | 7% | 7% | 7% | 7% | 7% |
| Malt Extract[1] | 2% | 2% | 2% | 2% | 2% | 2% | 2% | 2% | 2% | 2% | 2% |
| Salt[1] | 1.50% | 1.50% | 1.50% | 1.50% | 1.50% | 1.50% | 1.50% | 1.50% | 1.50% | 1.50% | 1.50% |
| Myvaplex 600 P | 0% | 0.25% | 0.50% | 0.19% | 0.13% | 0.06% | 0% | 0% | 0% | 0% | 0% |
| Rice bran extract emulsion | 0% | 0% | 0% | 0.13% | 0.25% | 0.38% | 0.25% | 0.50% | 0.75% | 1.00% | 2.00% |
|  | 99.5% | 99.8% | 100.0% | 99.8% | 99.9% | 99.9% | 99.8% | 100.0% | 100.3% | 100.5% | 102% |
| Bulk Density (kg/m3) | 10.8 | 9.6 | 11.0 | 10.9 | 10.6 | 9.6 | 9.6 | 9.0 | 8.7 | 9.0 | 9.0 |

[1]These ingredients are blended as a slurry with water which is then added at a 15% rate to a dry mix of 99.4% rice flour and 0.6% Myvaplex 600P (or rice bran extract).

EXAMPLE 2

A semolina spaghetti was prepared from a dough containing semolina flour. The control (Run #1) contained no extruder processing aid, whereas Runs #2–#15 contained increasing amounts of rice bran extract to be compared with Runs #6–#19 with MYVAPLEX. The composition of the dough and extruder processing conditions are given Table 2.

The pasta was then scored for color, cooking loss, firmness and cooked weight. Color was determined using a Minolta Color Difference Meter model CR310 as published in the November/December 1994 issue of Pasta Journal (p.31). A spaghetti sample with a color score 9.0 or above is very good, 8.0 to 8.9 is good, 7.5 to 8 is fair and below 7.5 is considered poor color (a bright yellow color is targeted in dry pasta).

AACC method 16-50 was used to determined the amount of solubles lost during cooking. A spaghetti sample is considered of very good quality if its cooking loss is below 6.0%, good if its cooking loss ranges from 6.0 to 7.0%, fair between 7 and 8, and poor quality above 8.0%.

Firmness was determined according to AACC method 16-50 with some modifications: A texture analyzer model TA-XT2 from Texture Technologies Corp was used for the firmness test. Also two cooked spaghetti strands instead of five (as described in the AACC method 16-50) were used for the measurement. A spaghetti sample with a firmness value 6.0 g.cm or higher is considered firm, 5.0 to 5.9 g.cm. is moderately firm, and below 5.0 g.cm. is considered soft.

Cooked weight was also determined according to AACC method 16-50. Generally a cooked spaghetti sample will weigh three times (about 30 g) its original dry weight (10 g). A pasta sample is considered as good quality if it has a high cooked weight and a firm bite.

Usually no extruder processing aids are added to semolina pastas. Extruder processing aids are needed, however, with specialty pastas (e.g., rice, corn or other grains) or when additives, such as spinach, oregano, and so forth, are incorporated into the dough. The "natural foods" market cannot use current processing aids such as MYVAPLEX as this would invalidate the labeling of the product as "natural." Rice bran extract can be used as a processing aid, however, in such pastas and the product marketed as all-natural.

EXAMPLE 3

Figure 2A:
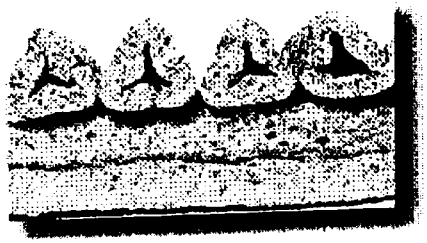
FIG. 2A is a photograph of a co-extruded tube with MYVAPLEX as the processing aid for comparison; and, FIG. 2B is a photograph of a co-extruded tube with a rice bran extract as the processing aid in accordance with the present invention.
Figure 2B:
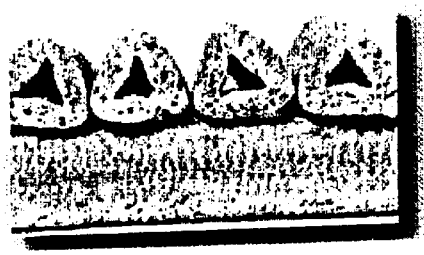

Co-extrusion tubes were prepared as shown in FIG. 2A and FIG. 2B, the product on the left being produced with MYVAPLEX as the processing aid for purpose of comparison with the product on the right wherein rice bran extract was the processing aid.

The tubes were formed from a dough comprising, on a percent by weight basis, 70% wheat flour, 17% corn meal, 12% sucrose, 0.5% salt and 0.5% processing aid.

The MYVAPLEX formulation ran well, however, it showed a reduced definition of shape or fillable area. The rice bran extract produced tubes with improved shape, texture and crispiness and had better seam closure after moving through the die. The raw product coming out of the extruder with the rice bran extract required virtually no drying time. In addition to these benefits, the bulk density

TABLE 2

| Formulation Ingredient (%) | Run #1 Control 0 | Run #2 0.5% RBE[1] | Run #3 1.0% RBE[1] | Run #4 1.5% RBE[1] | Run #5 2.0% RBE[1] | Run #6 0.5% Myvaplex | Run #7 1.0% Myvaplex | Run #8 1.5% Myvaplex | Run #9 2.0% Myvaplex |
|---|---|---|---|---|---|---|---|---|---|
| Semolina/Flour (g) | 1000 | 995 | 990 | 985 | 980 | 995 | 990 | 985 | 980 |
| Water added (ml) | 260 | 260 | 260 | 260 | 260 | 260 | 260 | 260 | 260 |
| Absorption (%) | 31.6 | 31.6 | 31.6 | 31.6 | 31.6 | 31.6 | 31.6 | 31.6 | 31.6 |
| Water T (° C.) | 45 | 45 | 45 | 45 | 45 | 45 | 45 | 45 | 45 |
| Mixing Time (Min) | 5 | 5 | 5 | 5 | 5 | 5 | 5 | 5 | 5 |
| Amps | 2.15 | 2.15 | 2.17 | 2.15 | 2.16 | 2.15 | 2.20 | 2.15 | 2.17 |
| Extrusion speed (cm/min) | 86.2 | 86.2 | 86.1 | 86.2 | 87.4 | 90.4 | 93.6 | 93.0 | 96.4 |
| Shaft speed (rpm) | 25.5 | 25.5 | 25.5 | 25.5 | 25.5 | 25 | 25 | 25 | 25 |
| Barrel Temperature (° C.) | 43.8 | 44.1 | 44.4 | 44.5 | 44.7 | 44.4 | 44.2 | 44.8 | 44.5 |
| Vacuum (Inch.Hg) | 18 | 18 | 18 | 18 | 18 | 18 | 18 | 18 | 18 |

[1]RBE is rice bran extract.

The data are reported in Table 3. When 0.5% rice bran extract was the extruder processing aid, the average cook weight was 30.6, whereas the average cook weight of the spaghetti was 30.1 when 0.5% MYVAPLEX was added. This demonstrates that the addition of rice bran extract increased the absorption of water during cooking.

TABLE 3

| Sample No. | Sample Description | Ave cook loss | Ave cook weight | Ave Firmness | Color Score |
|---|---|---|---|---|---|
| Run 1 | Semolina | 5.3 | 30.7 | 5.92 | 9.0 |
| Run 2 | 0.5% RBE[1] | 5.7 | 30.6 | 5.92 | 8.0 |
| Run 3 | 1.0% RBE[1] | 5.8 | 31.0 | 5.71 | 7.8 |
| Run 4 | 1.5% RBE[1] | 5.9 | 30.9 | 5.90 | 7.5 |
| Run 5 | 2.0% RBE[1] | 6.0 | 30.8 | 5.76 | 5.5 |
| Run 6 | 0.5% Myvaplex | 5.6 | 30.1 | 5.97 | 9.0 |
| Run 7 | 1.0% Myvaplex | 5.5 | 29.7 | 5.98 | 9.0 |
| Run 8 | 1.5% Myvaplex | 5.3 | 29.3 | 5.65 | 9.0 |
| Run 9 | 2.0% Myvaplex | 5.4 | 28.8 | 5.64 | 9.0 |

[1]RBE is rice bran extract.

was reduced significantly (18 g/8 tubes vs. 26 g/8 tubes). The formulation with rice bran extract also allowed additional sugar caramelization to occur, which resulted in a darker color. In summary, the tubes made with rice bran extract as the processing aid provided a more desirable product (i.e., better definition of shape, enhanced texture, required less drying, had lower bulk density and improved product strength).

EXAMPLE 4

As snack makers are well aware, corn can be extremely difficult to extrude because of differences in the quality of the corn meal. This problem results in downtime, changes in product quality and increased production costs. While the ability to screen the corn for quality is useful, being able to adjust the extrusion process is more desirable. Several snack makers and extruder manufacturers have used the rice bran extract as a processing aid to solve this extrusion problem, either as a first aid solution or as a prophylactic to prevent the problem.

In view of the above, it will be seen that the several objects of the invention are achieved and other advantageous results attained. As various changes could be made in the above described methods without departing from the scope of the invention, it is intended that all matter contained in the above description or shown in the accompanying drawings shall be interpreted as illustrative and not in a limiting sense.

What is claimed:

1. A method for improving machinability of a workable dough and/or providing improved functional properties in the final product comprising adding a rice bran extract to an extruded or sheeted pasty mass, said rice bran extract having been prepared by treating rice bran with a nonspecific protease in the presence of water and separating the rice bran into an insoluble dietary fiber component and a rice bran extract.

2. The method of claim 1 wherein the rice bran extract is dried and contains proteins, fats, phospholipids and pentosans.

3. The method of claim 1 wherein the rice bran extract comprises about 0.1 to 2.0% by weight of the dough.

4. The method of claim 3 wherein a combination of the rice bran extract and a monoglyceride or a mixture of mono- and diglycerides functions as the processing aid.

5. The method of claim 1 wherein the dough contains starch and the rice bran extract is dry mixed with the starch.

6. A method for improving extrusion characteristics of a food product in an extruder comprising the steps of a) forming a dough containing starch, a rice bran extract as a processing aid and moisture, said rice bran extract comprising about 0.1 to 2.0% by weight of the dough and having been prepared by treating rice bran having a naturally occurring lipase enzyme that causes rancidity with a nonspecific protease in the presence of water for a time sufficient to substantially deactivate the lipase enzyme and separating the rice bran into an insoluble dietary fiber component and a rice bran extract, b) extruding the dough, and, d) forming the dough into pieces of desired shape.

7. The method of claim 6 wherein a combination of the rice bran extract and a monoglyceride or a mono- and diglyceride mixture functions as the processing aid.

8. The method of claim 6 wherein the starch is a corn derivative that has been treated with alkaline and has a raw corn flavor note whereby the rice bran extract improves flavor by rounding out the raw corn flavor note.

9. The method of claim 6 wherein the rice bran extract is dry mixed with the starch.

10. The method of claim 6 wherein the rice bran extract is provided as an emulsion and mixed with the moisture or with an oil.

11. The method of claim 6 wherein the rice bran extract is produced from a full-fat bran and comprises about 17% by weight proteins, 18–24% by weight fats, 38–46% by weight carbohydrates, 6% by weight water with the balance being ash.

* * * * *